United States Patent
Cai et al.

(10) Patent No.: US 8,968,439 B2
(45) Date of Patent: Mar. 3, 2015

(54) COMPOSITE MICROPOROUS FILTER MATERIAL

(75) Inventors: Weilong Cai, Xiamen (CN); Xiangbo Luo, Xiamen (CN); Zhangsheng Luo, Xiamen (CN); Guoqiang Qiu, Xiamen (CN); Limei Hong, Xiamen (CN)

(73) Assignee: Xiamen Savings Environmental Co., Ltd., Xiamen, Fujian (CN)

( * ) Notice: Subject to any disclaimer, the term of this patent is extended or adjusted under 35 U.S.C. 154(b) by 0 days.

(21) Appl. No.: 13/820,517

(22) PCT Filed: Mar. 4, 2011

(86) PCT No.: PCT/CN2011/071516
§ 371 (c)(1),
(2), (4) Date: Mar. 3, 2013

(87) PCT Pub. No.: WO2012/119291
PCT Pub. Date: Sep. 13, 2012

(65) Prior Publication Data
US 2014/0000229 A1  Jan. 2, 2014

(51) Int. Cl.
*B01D 59/50* (2006.01)
*B01D 39/16* (2006.01)

(52) U.S. Cl.
CPC ............ *B01D 39/16* (2013.01); *B01D 39/1623* (2013.01); *B01D 2239/0636* (2013.01); *B01D 2239/065* (2013.01); *B01D 2239/0659* (2013.01)

USPC ............ 55/485; 55/482; 55/486; 55/514; 55/522; 55/524; 55/527; 442/381; 442/383; 442/388; 442/389; 442/402; 442/403

(58) Field of Classification Search
CPC ................................. B01B 2239/00–2239/0291
USPC ............ 55/522–527, 482–489; 442/1, 11, 13, 442/14, 381, 383, 388, 389, 402, 403
See application file for complete search history.

(56) References Cited

U.S. PATENT DOCUMENTS

2009/0049816 A1* 2/2009 Kohli et al. ............. 55/527
2011/0011044 A1* 1/2011 Kohli et al. ............. 55/381

* cited by examiner

*Primary Examiner* — Thomas McKenzie

(57) ABSTRACT

The composite microporour filter material comprises a base-cloth layer, an upper adhesion layer attached to a top side of the base-cloth layer, and a lower adhesion layer attached to a bottom side of the base-cloth layer. The base-cloth layer is made of either polymide yarn base-cloth, polysulfoneamide yarn base-cloth, or polytetrafluoroethylene filament base-cloth. The upper adhesion layer is made of a mixture of polysulfoneamide short-staple and polymide short-staple; the lower adhesion layer is made of a pure polysulfoneamide short-staple. The upper adhesion layer and the lower adhesion layer are attached to two sides of the base-cloth layer by entangling which is adopted by needle punching, spunlacing or a combination thereof. The present filter material is temperature-resistant and corrosion-resistant and has features of a low manufacturing cost and the high filter precision.

1 Claim, 1 Drawing Sheet

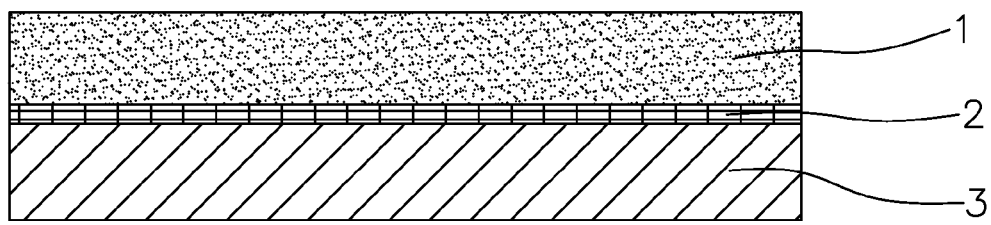

COMPOSITE MICROPOROUS FILTER MATERIAL

BACKGROUND OF THE INVENTION

1. Field of the Invention

The present invention relates to a design of a dust-collecting technology of industrial heat gas filter, particularly to polysulfoneamide composite microporour filter material filled with polymide.

2. Description of the Related Art

The heavy chemical industry which is mainly about the consumption of the resources and energy has been rapidly developed in the past few years. China becomes the biggest production country at steel, cement, coal, and chemical fiber, and the second production country at power, nonferrous metals, and chemical fertilizer in the world, which brings environmental pollution. The country continually revises the emission values of various industrial boilers and kilns, so the emission density value decreases substantially. By adopting the technology of bag-type collection can even render the emission density value be less than the standard value. The heat gas is the main feature of the air contaminant of the heavy chemical industry, and the smoke particulate is one of the main controlling subjects, wherein, the respirable particulate seriously endangers the human health. The filter material requires not only being temperature-resistant and corrosion-resistant but also providing with a higher filter precision.

As one of the temperature-resistant fibers, Polymide (P84 fiber) has a bigger superficial measure because of the unique foliar-shaped structure, and the fiber curls naturally. The cohesion and the intertwisting force between the fibers are greatly enhanced in the needle punching process so as to provide with an excellent performance. However, the price of P84 fiber is expensive. If the filter material is only made of P84 fiber, the manufacturing cost would be greatly increased, so that the price is increased and the developing of market and the popularized application would be harmed.

In consideration of that, the inventor thoroughly researches the conventional filter materials, and develops a microporour filter material with low manufacturing cost and high filter precision.

SUMMARY OF THE INVENTION

It is therefore the purpose of this invention to provide a temperature-resistant and corrosion-resistant composite microporour filter material with low manufacturing cost, and high filter precision.

To achieve the foregoing purposes, the solvent of the present invention is shown as follows:

A composite microporour filter material comprises a base-cloth layer, an upper adhesion layer attached to a topside of the base-cloth layer, and a lower adhesion layer attached to a bottom side of the base-cloth layer. The base-cloth layer is made of either polymide yarn base-cloth, polysulfoneamide yarn base-cloth or polytetrafluoroethylene filament base-cloth. The upper adhesion layer is made of the mixture of polysulfoneamide short-staple and polymide short-staple; the lower adhesion layer is made of a pure polysulfoneamide short-staple. The upper adhesion layer and the lower adhesion layer are attached to two sides of the base-cloth layer by entangling which is adopted by needle punching, spunlacing, or a combination thereof.

Preferably, a density of a three-layered composite material made by attaching the upper adhesion layer, the base-cloth layer, and the lower adhesion layer with each other is 450~650 g/m$^2$.

Preferably, a proportion of the polysulfoneamide short-staple of the upper adhesion layer to the polymide short-staple of the upper adhesion layer in weight is 1:1~9:1.

The composite microporour filter material of the present invention fills the polysulfoneamide fibers with the expensive polymide fibers in a fixed rate and compounds the fibers into the felt by specific craft. Wherein, the Shang-hai textile academy in China is the first agency to do the research on aromatic copolysulfonamide in 1973. By changing the traditional technique adopted by the other international companies using the m-phenylenediamine as the second monomer, a new type of temperature-resistant fiber, namely polysulfoneamide (PSA fiber), is developed successfully and achieves industrialization. The chemical structure of the PSA fiber renders itself have a superior performance of temperature-resistance, fire retardation, and chemical corrosion-resistance. The present invention perfectly combines the two features and becomes a filter felt with high performance which could extensively apply to filter the heat and high density smoke, especially to the control of the respirable particulate PM10, PM5, even PM2.5, so that the total cost of the filter material is reduced. The present invention has the advantages as follows:

1. The upper adhesion layer is filled with the heterstructured P84 short-staple. Because of the unique trilobal fiber cross-section therefrom, the superficial measure is bigger, the porosity of the felt coating is enhanced, and the bore diameter is smaller so as to effectively filter the repirable particulate for achieving the superficial filter effect and enhancing the filter efficiency.
2. The main element of the upper adhesion layer is PSA fiber which has a better temperature-resistance, chemical corrosion-resistance, and fire retardation.

The advantages of the present invention over the known prior arts will become more apparent to those of ordinary skilled in the art by reading the following descriptions with the relating drawings. The polysulfoneamide composite microporour filter material filled with the polymide is not restricted.

BRIEF DESCRIPTION OF THE DRAWINGS

FIG. 1 is a 3D asymmetric schematic view showing a first preferred embodiment of the microporour filter material of the present invention.

DETAILED DESCRIPTION OF THE PREFERRED EMBODIMENTS

Referring to FIG. 1, the schematic view of the composite microporour filter material which comprises a base-cloth layer 2, an upper adhesion layer 1 attached to a top side of the base-cloth layer, and a lower adhesion layer 3 attached to a bottom side of the base-cloth layer. The base-cloth layer 2 is a Polytetrafluoroethylene (PTFE) filament base-cloth (which could also be a polymide yarn base-cloth or a polysulfoneamide yarn base-cloth); the upper adhesion layer 1 is a blending layer of the Polysulfoneamide (PSA) short-staple and the Polymide (P84) short-staple. The proportion of the PSA short-staple to the P84 fiber in weight could be 1:1~9:1 (in the preferred embodiment is shown as 5:1); the lower adhesion layer 3 adopts a PSA short-staple coating with quality of 100%; the upper adhesion layer 1 and the lower adhesion layer 3 are attached to a top side and a bottom side of the base-cloth layer 2 by entangling.

The method for manufacturing the foregoing microporour is: the density of the finished product is 450–650 g/m² (the best density is 550 g/m²). Concretely, the base-cloth layer 2 adopts a PTFE filament base-cloth with the density of 120 g/m²; the densities of the upper adhesion layer 1 and the lower adhesion layer 3 respectively are 215 g/m²; the upper adhesion layer 1 adopts a PSA short-staple filled with a P84 short-staple whose proportion in weight is 17%; the lower adhesion layer 3 is a PSA short-staple with a proportion of 100% in weight. The steps are:

1. After opening, carding, and lapping the upper adhesion layer 1 and the lower adhesion layer 3, the upper adhesion layer 1 and the lower adhesion layer 3 are pre-needled with the base-cloth layer 2 to become a plain felt. The upper adhesion layer 1 and the lower adhesion layer 3 are formed at the top side and the bottom side of the base-cloth layer 2.
2. The plain felt is processed into a fine spunlaced felt via multiple spunlacing processes and shaped by a stenter machine under the temperature ranging from 220° C. to 280° C. for 6 minutes so as to eliminate the mechanical inner stress generated from processing.
3. The shaped needle punching felt is singed and calendered, thereby improving the superficial effect of the filter and controlling the thickness and the allowing ventilation of the filter to ensure a good performance in dust cleaning.
4. Finally, the filter felt is intumesced and coated with polytetrafluoroethylene to proceed a superficial microporour process and attain a microporour filter material which enhances the filter precision and the filter efficiency and effectively improves the performances of filter hardproof and chemical corrosion.

To sum up, the present invention makes use of the upper adhesion layer 1 adopting a PSA short-staple filled with P84 short-staple. Due to the upper adhesion layer 1 filled with the P84 short-staple whose cross-section is leaf-shaped, the filter measure of the dust area is greatly increased, and the porosity is also enhanced. Furthermore, the lower adhesion layer 3 ensures an adequately ventilation during the filter process so as to enhance the filter efficiency.

While we have shown and described the embodiment in accordance with the present invention, it should be clear to those skilled in the art that further embodiments may be made without departing from the scope of the present invention.

We claim:

1. A composite filter material characterized by a density of 545-650 g/m², comprising
    a base-cloth layer including a PTFE filament base-cloth with a density of 120 g/m²,
    an upper adhesion layer with a density of 215 g/m² entangled by needle punching, spunlacing, or a combination thereof to a top side of said base-cloth layer, and
    a lower adhesion layer with a density of 215 g/m² entangled by needle punching, spunlacing, or a combination thereof to a bottom side of said base-cloth layer;
    said base-cloth layer being made of either polymide yarn base-cloth, polysulfoneamide yarn base-cloth or polytetrafluoroethylene filament base-cloth;
    said upper adhesion layer made in weight of 83% polysulfoneamide staple mixed with 17% of polymide staple;
    said lower adhesion layer being made 100% of a polysulfoneamide staple;
    produced by ordered steps:
    1) losing up, carding, and lapping the upper adhesion layer and the lower adhesion layer prior to needled with the base-cloth layer for forming a plain felt; followed by
    2) applying spunlacing more than one time to said plain felt, further shaped by a stenter machine at 220-280° C. to reduce mechanical inner stress; followed by
    3) singing and calendaring; and
    4) intumescing and coating with polytetrafluoroethylene.

* * * * *